United States Patent [19]
Hube et al.

[11] Patent Number: 5,167,013
[45] Date of Patent: Nov. 24, 1992

[54] USER DEFINABLE FONT SUBSTITUTIONS WITH EQUIVALENCY INDICATORS

[75] Inventors: Randall R. Hube; Cheryl A. Sampson; Russell W. Simpson, all of Rochester, N.Y.

[73] Assignee: Xerox Corporation, Stamford, Conn.

[21] Appl. No.: 590,103

[22] Filed: Sep. 28, 1990

[51] Int. Cl.$^5$ ............................................. G06K 15/00
[52] U.S. Cl. .................................... 395/110; 395/115
[58] Field of Search .............. 395/101, 110, 112, 114, 395/115, 150, 151, 164, 165; 340/735; 358/467, 470; 400/171, 172, 109–111, 69, 72

[56] References Cited

U.S. PATENT DOCUMENTS

| | | | |
|---|---|---|---|
| 3,634,822 | 1/1972 | Chow | 340/146.35 |
| 4,114,750 | 9/1978 | Baeck et al. | 400/279 |
| 4,205,922 | 6/1980 | Pascoe | 400/171 |
| 4,267,443 | 5/1981 | Carroll et al. | 250/221 |
| 4,353,653 | 10/1982 | Zimmerman | 400/70 |
| 4,388,010 | 6/1983 | Mott et al. | 400/692 |
| 4,660,999 | 4/1987 | Tsuneki | 400/61 |
| 4,686,525 | 8/1987 | Nagata | 340/790 |
| 4,745,561 | 5/1988 | Hirosawa et al. | 364/523 |
| 4,763,281 | 8/1988 | Arakawa | 364/523 |
| 4,837,712 | 6/1989 | Shibamiya | 364/523 |

Primary Examiner—Arthur G. Evans
Attorney, Agent, or Firm—Mark Costello

[57] ABSTRACT

In a printer system which allows printing in multiple fonts, where the font to be used is specified in an encoded document to be printed, an operator designation of font equivalency is provided which specifies acceptable font substitutes of available fonts for unavailable fonts. Upon detection of a document specification of an unavailable font, a print controller searches a mapping of known fonts to available fonts to determine if an equivalent font has been designated. The mapping is operator-set in accordance with the operator perception of equivalence. Font equivalency mapping may be a yes/no equivalent, indicating substitution or job fault, or the mapping may have a multilevel substitution hierarchy, in which degress of equivalency are determined by the operator, and result in different warnings or machine operations dependent on different degrees of equivalency. An operator may also program the job to allow printing if the equivalency falls within a certain degree, changing that degree depending upon customer sensitivity to font use.

40 Claims, 12 Drawing Sheets

USER DEFINABLE FONT SUBSTITUTIONS WITH EQUIVALENCY INDICATORS

This invention relates generally to the control of font substitution in an electronic printer, and more particularly to an arrangement for providing operator control over font substitution selection.

BACKGROUND OF THE INVENTION

Large high speed electronic printers are now combinations of printing engines with extensive computational capability. As such printers enter the workplace, primarily in the print shop environment, the advantage of such devices over offset presses will be noted in the ease in which new jobs can be programmed. However, new customers that will be served by such devices are extremely sensitive to print quality, in general, and specifically, to the appearance of each page of text. One feature of the job to which print shops are particularly sensitized is the use of specified fonts for a printing job.

Heretofore, it has been difficult to specify fonts for use by electronic printers, which usually only provide a limited number of typefaces (such as modern, classic, helvetica, terminal, etc.) in a limited number of font sizes (8-point, 10-point, 12-point, etc,), and font orientations (portrait, landscape, inverse portrait, inverse landscape) with other specified font characteristics (bold, italic, stricken). Font provisions for electronic printers usually offer a limited number of resident fonts, and allow use of added fonts, commonly through cartridge addition which must be changed for each typeface or font, although addition of fonts via a communication channel is known. Generally fonts are very memory intensive, and in a small scale use, only a few fonts can be made available on a single printer. A single, very complete typeface which might provide bitmaps for several fonts of many sizes, each size in any of four orientations, each size and orientation also provided with specified characteristics, and which provides a large number of characters through each font, takes up a significant amount of electronic memory. Of course, some typefaces are more or less developed than others.

In large high speed electronic printers, significantly larger memories are available, allowing the storage of many fonts in a font memory. However, the memory of such devices is not infinite, the addition of new fonts might require operator intervention, and in general, a user would desire optimization of his use of font memory by providing the most used fonts in device storage, and have relatively little used fonts stored on external media for use in the device only as required. A class of users may exist who do not know what fonts are available, who send jobs specifying certain fonts.

A user may elect for reasons of cost, availability or simplicity, to have a relatively small number of fonts available for use. In such cases, where the font called by a document to be printed is not available, a substitute may be used, or a default in the printing of the document must be declared. In a highly automated device, such a default may be undesirable.

Substitution of available fonts for unavailable fonts is a problem that has been considered. Typically, a print controller implements a substitution algorithm, which looks at the font characteristic information of available fonts, for comparison to the called-for font, and finds the nearest match, in accordance with a preset hierarchy of comparisons. Alternatively, the operator might specify a default. The hierarchy is set by the aesthetics of the algorithm developer. Thus, for example, the algorithm might attempt to match point size, weight, orientation, etc., on a weighted, or ordered basis. However, heretofore only two results have come from that comparison; first, an available font is substituted (sometimes accompanied by notice to the operator on a first sheet), or second, a fault is declared. However, when a fault is not declared, the substituted font may be unacceptable to the font sensitive user. An unacceptable job, which may result when a unacceptable font is used, and may be several thousand pages collated and bound, is an expensive error.

SUMMARY OF THE INVENTION

In accordance with the invention, there is provided an arrangement for providing operator mapping of font substitutions, and substitution warning.

In accordance with one aspect of the invention, in a printer system which allows printing in multiple fonts, where the font to be used is specified in an encoded document to be printed, an operator designation of font equivalency is provided which specifies acceptable font substitutes of available fonts for unavailable fonts. Upon detection of a document specification of an unavailable font, a print controller searches a mapping of known fonts to available fonts to determine if an equivalent font has been designated. The mapping is operator-set in accordance with the operator perception of equivalency. The present invention as an integral part within a printer system, or as a standalone adjunct to document creation.

In accordance with another aspect of the invention, substitutions may be prioritized, in the case where two substitutions may apply to a single font in different circumstances.

In accordance with yet another aspect of the invention, font equivalency mapping may have a yes/no indication of equivalence, indicating substitution or warning of substitution, or the mapping may have a multilevel substitution hierarchy, in which degrees of equivalency are determined by the operator, and result in different warnings dependent on different degrees of equivalency. A designation of equivalency, other than "perfect" equivalency, may result in a warning of substitution on a printed cover sheet, a pre-print confirmation requirement with the operator, who must take action to continuing the job, a machine fault, or other responses dependent upon the level of equivalency. An operator may also program the job to allow printing if the equivalency falls within a certain degree, changing that degree depending upon customer sensitivity to font use.

These and other aspects of the invention will become apparent from the following description used to illustrate a preferred embodiment of the invention in conjunction with the accompanying drawings in which.

Figure 1:
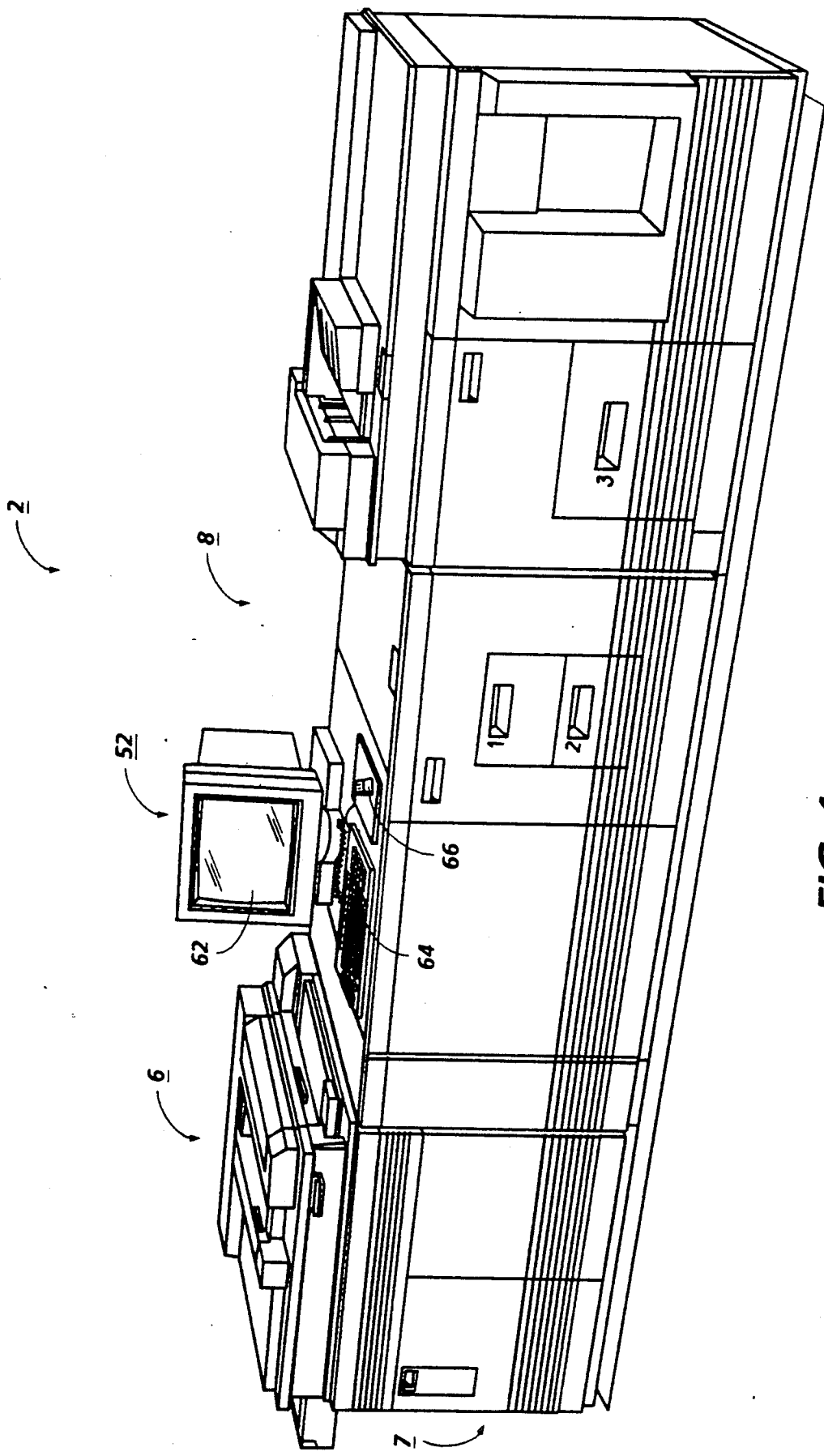
FIG. 1 is an isometric view of an illustrative xerographic reproduction machine incorporating the present invention.
Figure 5A:
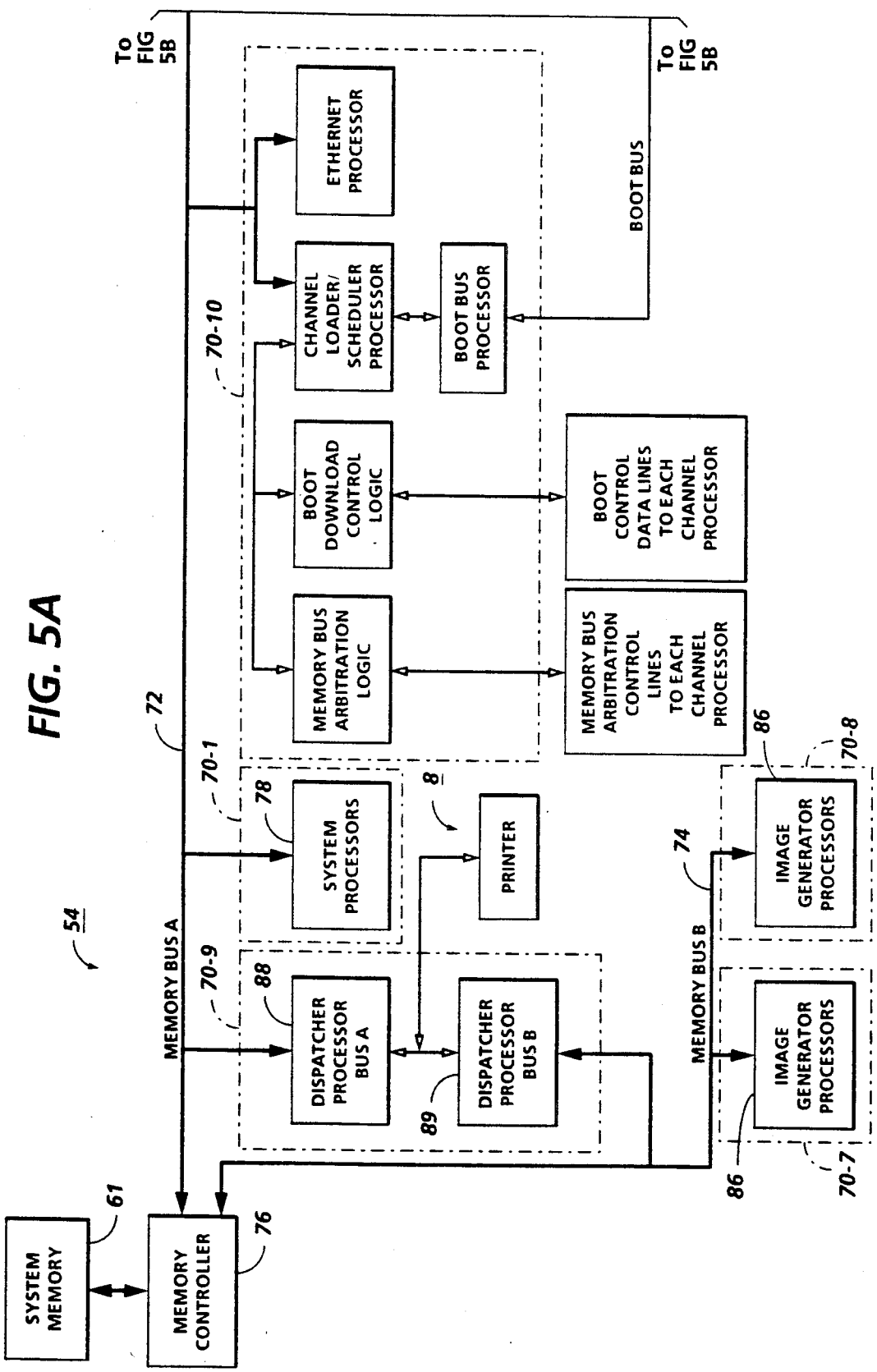
Figure 5B:
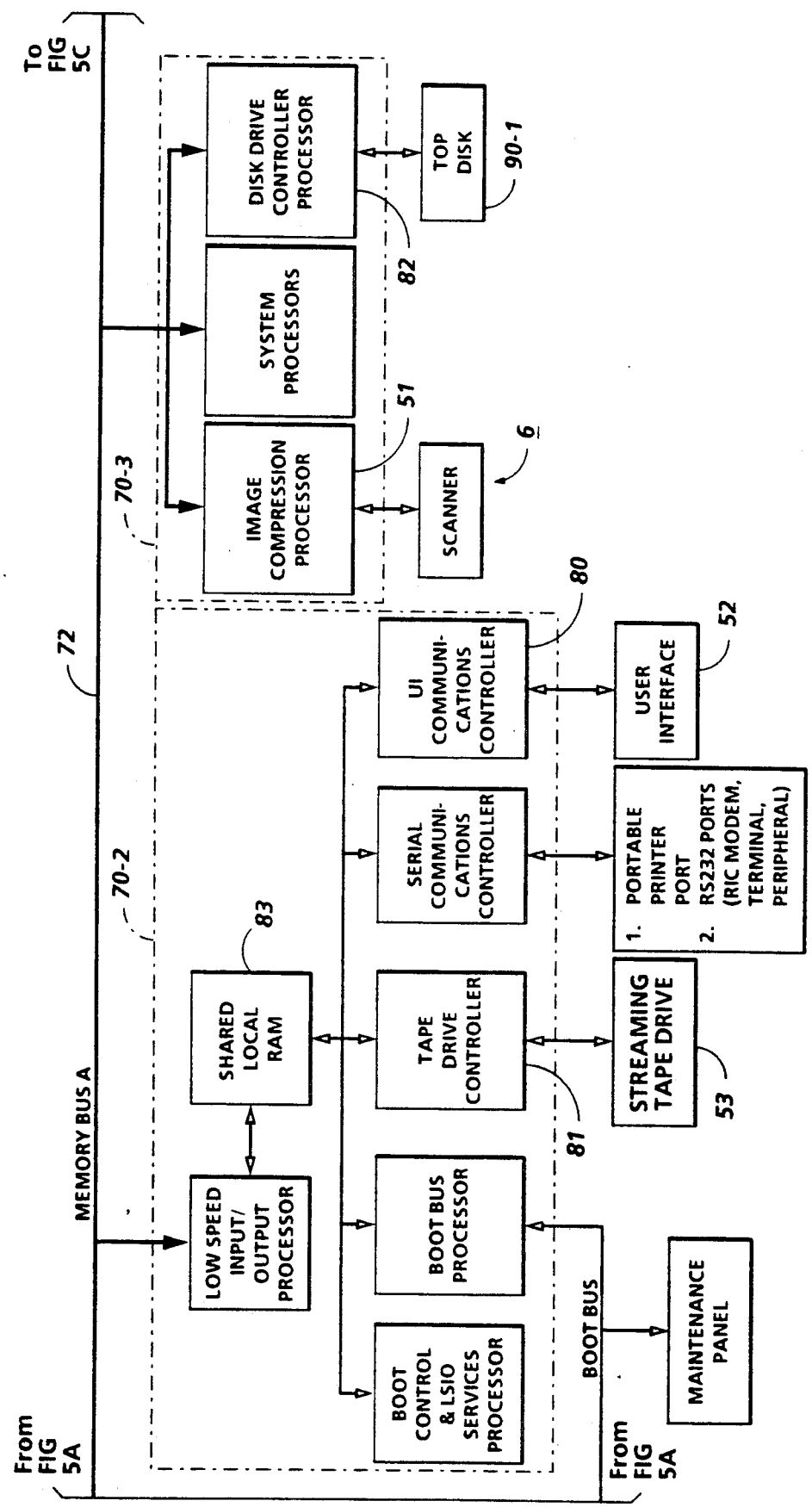
Figure 5C:
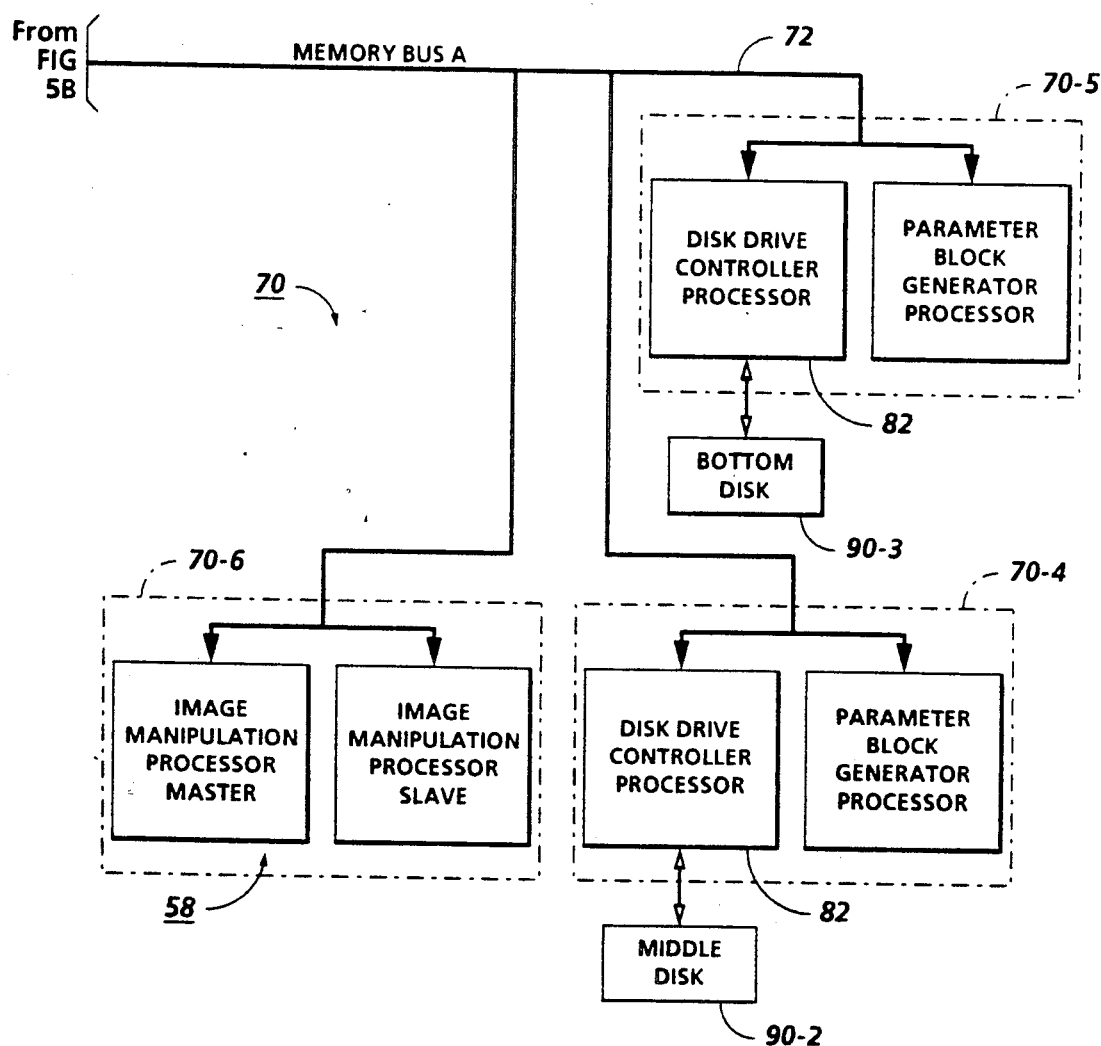
Figure 6:
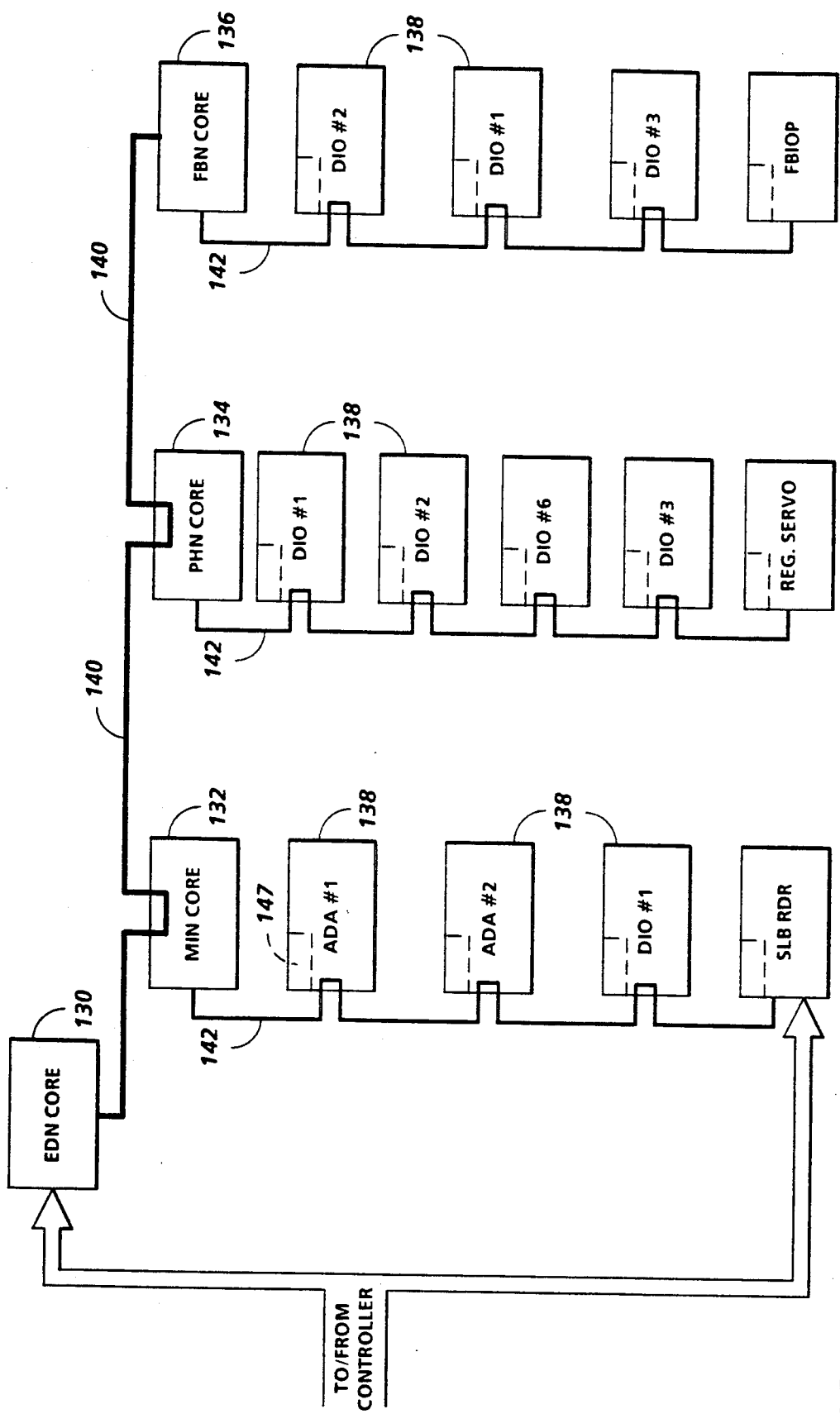
Figure 7:
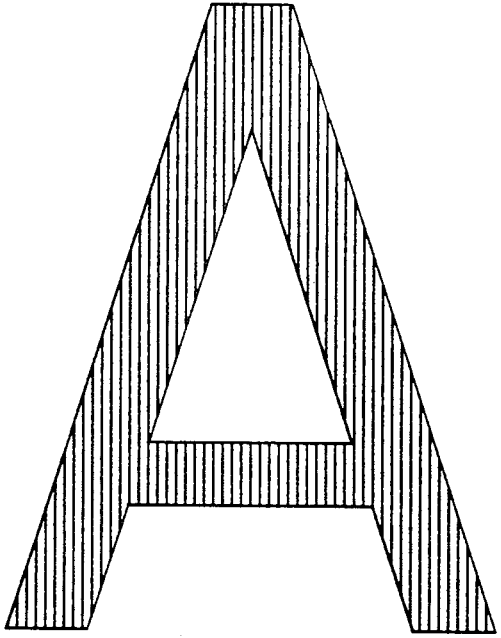
Figure 8:
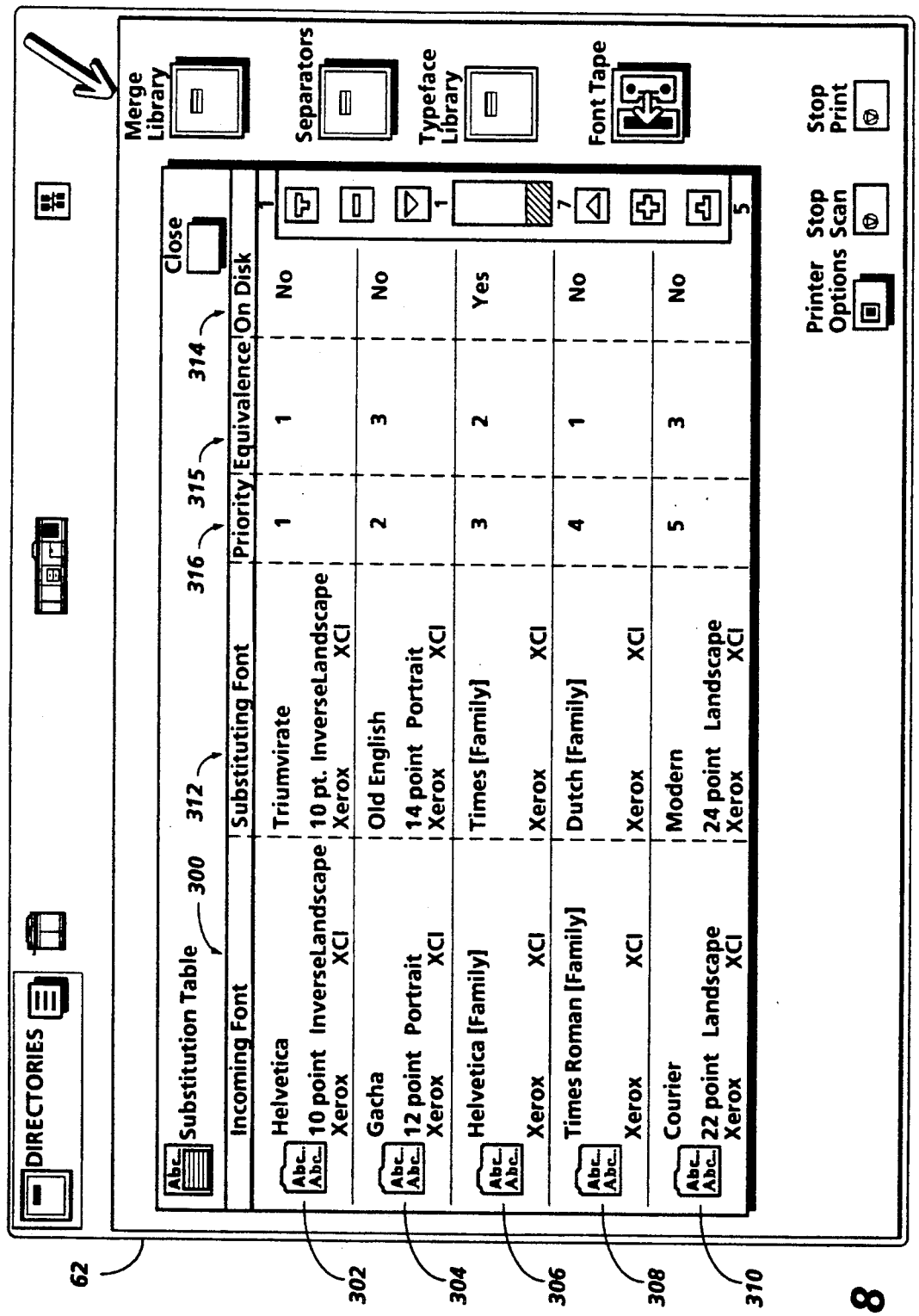

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 shows a font file for an example character;

FIG. 8 shows a user interface screen for a font substitution table; and

Figure 9A:
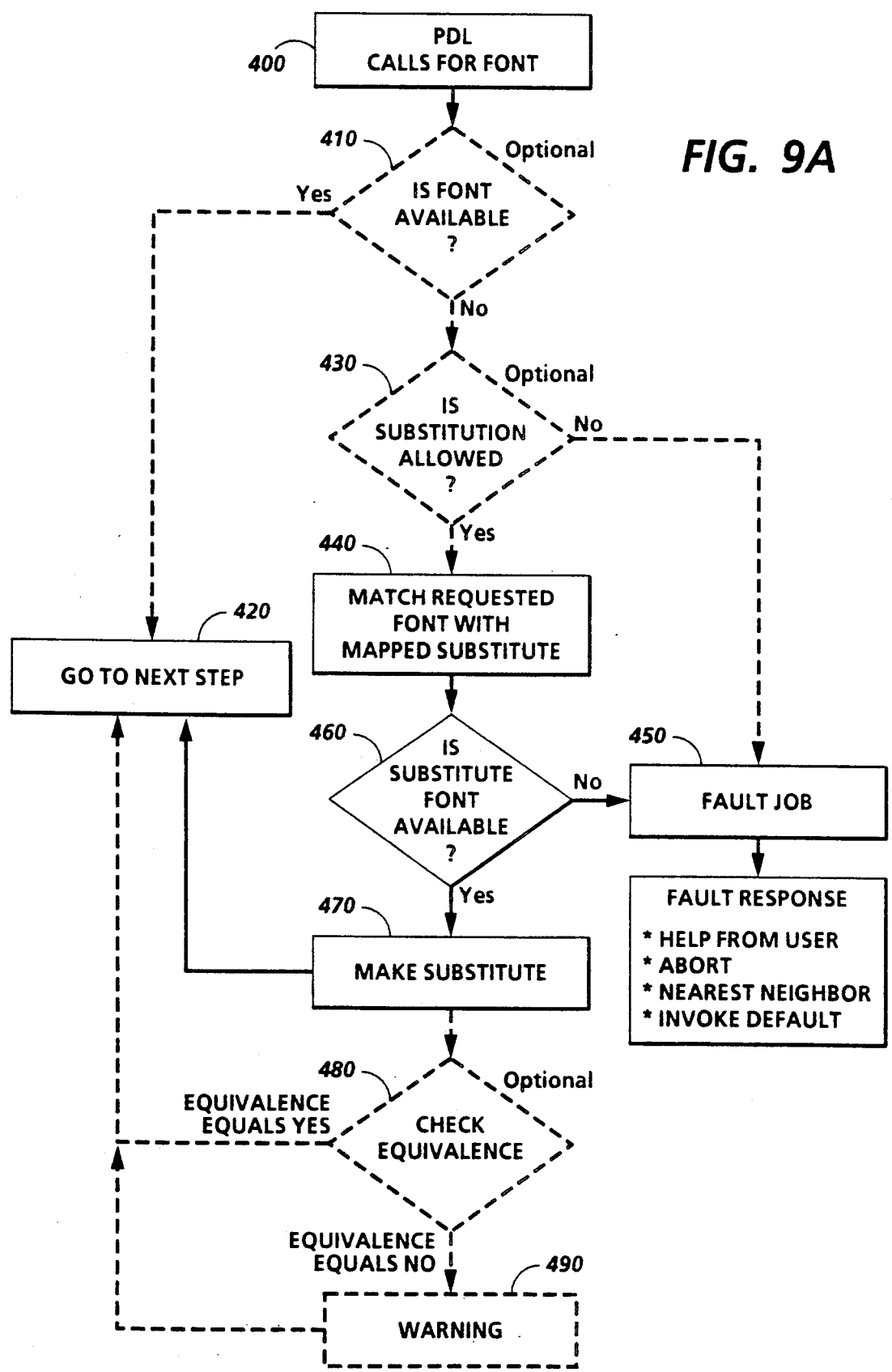
Figure 9B:
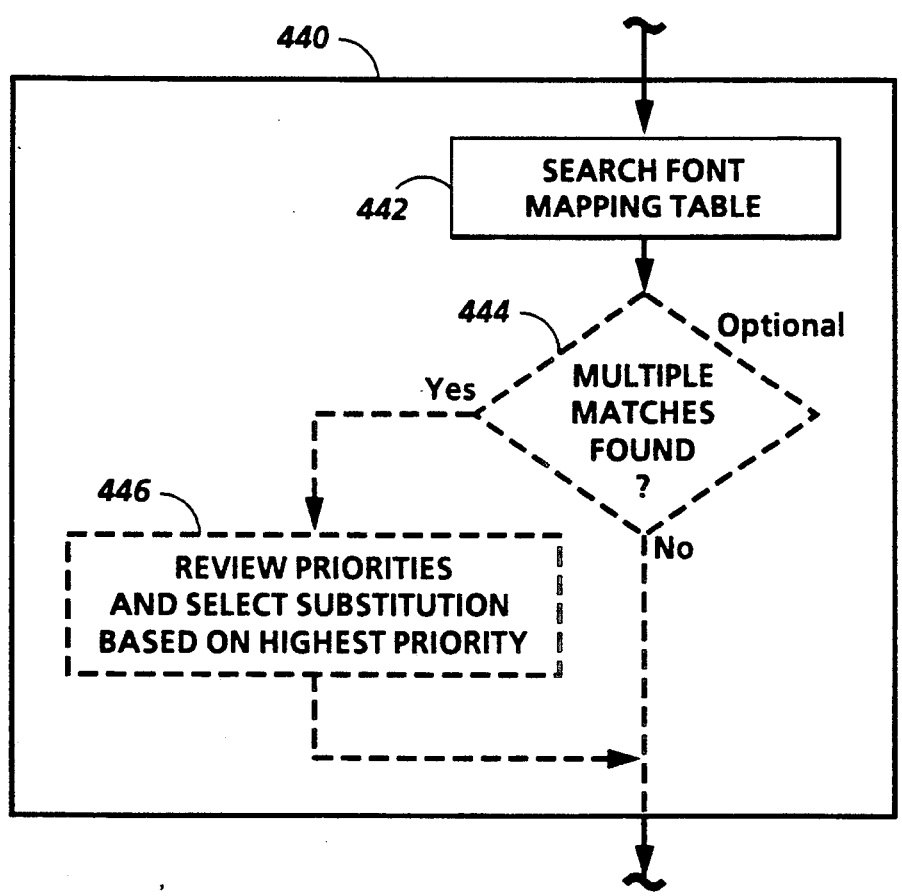

FIGS. 9A and 9B show a flow chart of the internal font substitution process.

Figure 2:
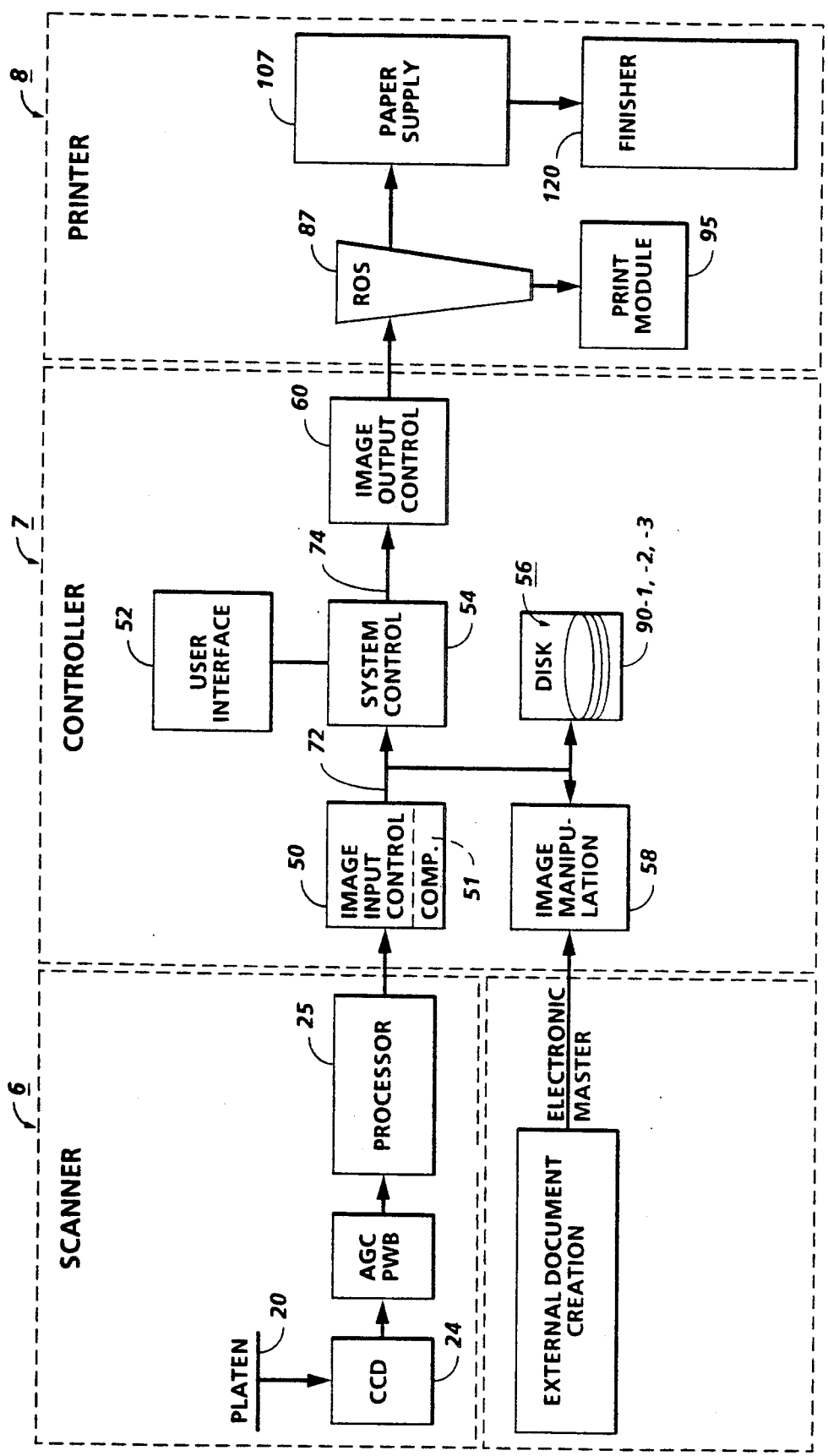
FIG. 2 is a block diagram depicting the major elements of the printing system shown in FIG. 1.

With reference to the drawings, where the showings are for the purpose of illustrating an embodiment of the invention and not for the purpose of limiting same, at FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc. "Printer" as used herein also includes the creation of print for a display, such as a CRT.

Figure 3:
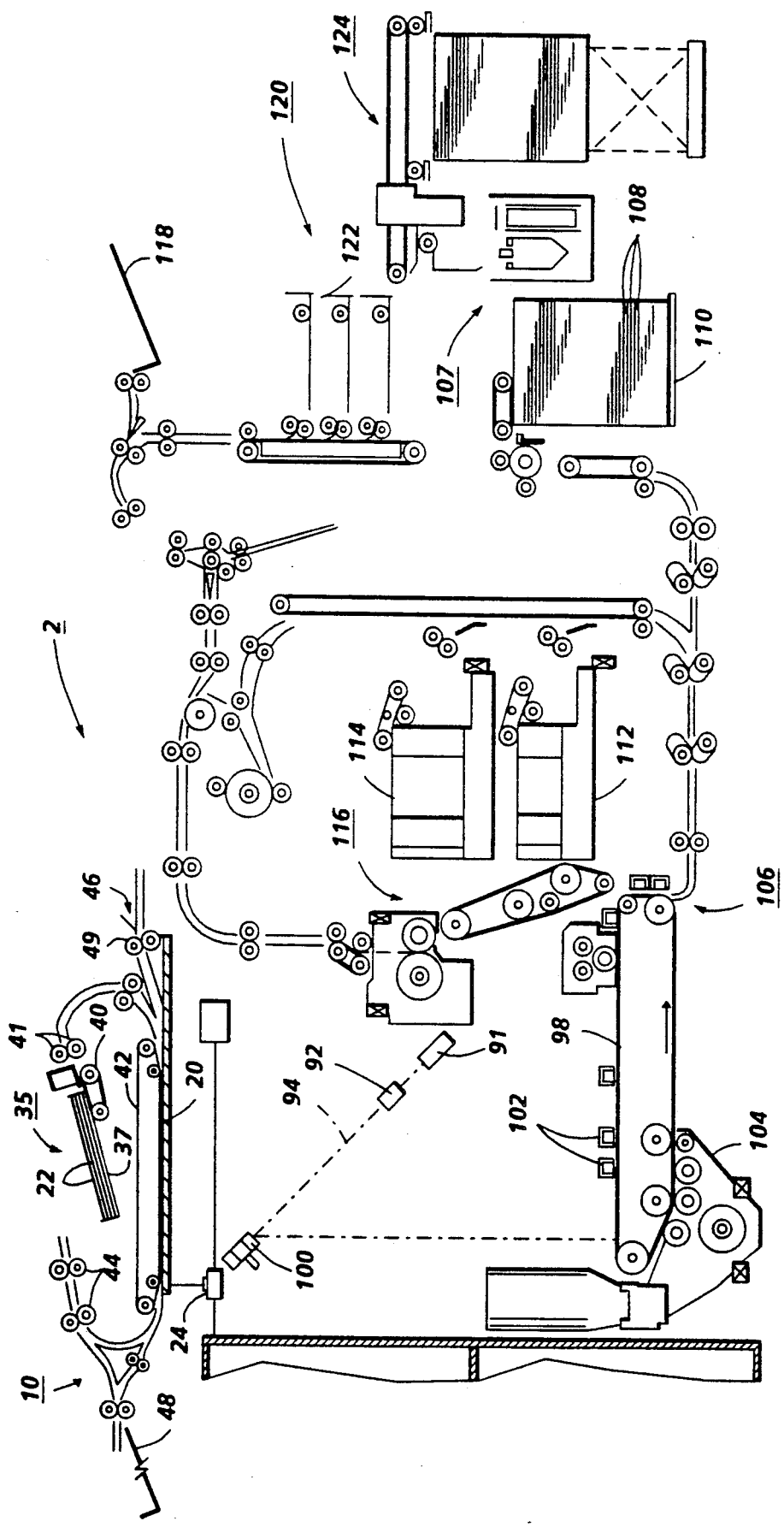
FIG. 3 is a plan view illustrating the principal mechanical components of the printing system shown in FIG. 1.
Figure 4:
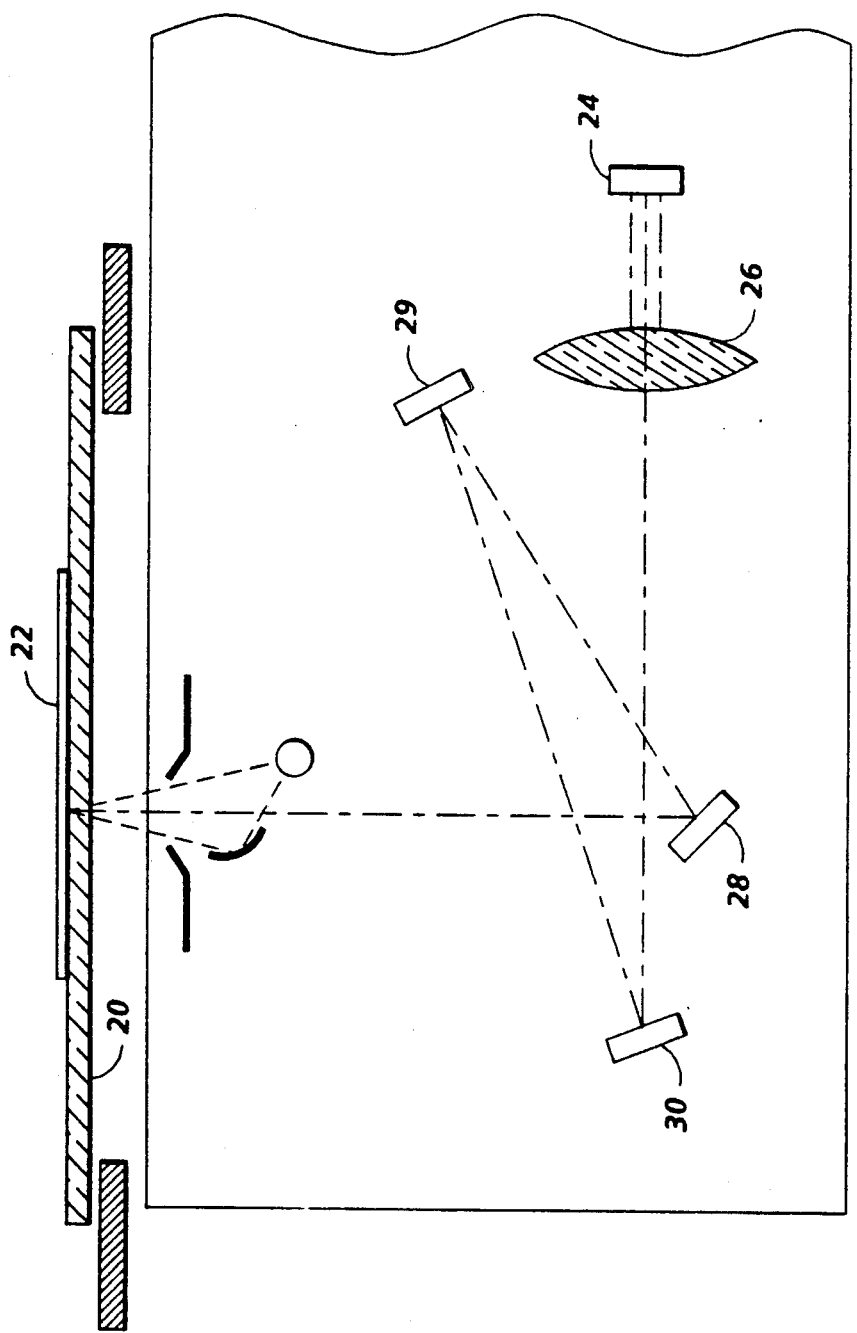
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line-like segment of platen 20 and the document being scanned thereon. Array 24 provides image signals or pixels representative of the image scanned which after suitable processing by processor 25, are output to controller section 7. For an alternate source of images for printing, documents in a page description language (PDL) such as Xerox Interpress, or Adobe Postscript can be sent from an external source, such as, for example, a publishing workstation, via a network connection, to image manipulation section 58, which will translate the document in a well known manner to a format suitable for printing, at controller section 7, for delivery to printer section 8. Conversion means (not shown), connected to the system either directly or through a network connection, may be provided for converting the PDL of incoming imaging data different that of the PDL of the system to the appropriate electronic format. The invention described herein may be incorporated into that device or into the printer system as described. Of course, in all cases, data may also be delivered to the system via storage media, such a floppy disk or tape, etc. Other data entry means may also be provided.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by charging devices 102 at a charging station preparatory to exposure by imaging beams 94. The latent electrostatic images are developed by developer 104 and transferred at transfer station 106 to a print media 108 delivered by Paper Supply section 107. Media 108 may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the pints into books.

Referring to FIGS. 1, 2 and 5, controller section 7 is, for explanation purposes, divided into an image input controller 50, User Interfacce (UI) 52, system controller 54, main memory 56, image manipulation section 58, and imaged output controller 60.

The scanned image date input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers of the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator contoller/CRT display consisting of an interactive touch sensitive screen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse. A similar user interface is described in U.S. Pat. No. 4,267,443, issued May 12, 1981 to Carroll et al., the relevant portions thereof being hereby incorporated by reference into the present application. Generally, operation and control information is stored in system memory and accessed by the system controller when necessary. The system controller regulates the operation of the machine based on user programming of desired features, and the system status, as determined by conventional switches and sensors. The features within the machine are then regulated through the control of individual electrical and electromechanical devices, such as conventional servomotors, solenoids, etc.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, ect are carred out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processor 88, 89 an PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52, and streaming tape controller 81 which controls and receives information from steaming tape drive 53; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are dustributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7, while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2. Referring again to FIGS. 1, 2, and 7, user interface 52 is comprised of U/I housing 200, touch sensitive display 62, touch sensor 202, and keyboard 64. Signals from touch sensor 202 are interpreted with respect to the current programming screen. Subsequently user selections are displayed on CRT display 62 and the appropriate machine subsystems are enabled, disabled or adjusted accordingly.

With reference to FIG. 2, fonts are stored in the system at main memory 56, so that during page decomposition of a page description language (PDL) at image manipulation section 58, fonts identified by the PDL for a document may be placed into a file ready for printing. Image manipulation device 58 could be embodied within a printer controller as shown in FIG. 2 or alternatively, in a stand alone component, which may produce and direct electronic data compatible with the printing device thereto.

With reference to FIG. 5B, when a new font is desired for addition to the library of fonts, font information is applied to the device, preferably at streaming tape drive 53, although certainly, the font information could be obtained from another media, network or communication channel. Streaming tape drive 53 is controlled by tape drive controller 81, which receives font information from a tape, and stores it to shared local RAM 83 on PWB 70-2, which acts as a buffer for the font information received.

With reference to FIG. 7, font information for each character in the font may include several parameters required when the font information is called by the PDL (page description language, e.g., Xerox Interpress, or Adobe Postscript) for use in a document. Accordingly, the information may include, generally, the file structure of FIG. 7, which includes in addition to a bitmap of the character (at 210), the typeface name 212 (of course, encoded values may used in place of alphanumerics); font indentification 214 in terms of weight, size and orientation; character set 216, a description of a group of characters which form a cohesive unit, such as the example, latin alphabet; and finally, the individual character code 218 in a character set which, for the PDL, represents an uppercase "A" no matter what font the character is in. These values are detectable, and comparisons may be set up between these values and stored values. It will no doubt be appreciated that if the font is a contour font, less information may be available, since usually only a single contour font is required for a typeface, but the principle remains the same with respect to the contour font identification of characters. Of course, the bitmap information is replaced by contour information in that situation. It should also be realized that bitmaps or contour information need not be provided for "incoming" fonts. However, certain identifying characteristics, such as character "width", may be provided to assist the system in placing the substitution character in the final print document.

In accordance with the invention and as shown in FIG. 8, a table of equivalency mappings made be created, which displays incoming fonts and characteristics, and identifies substitute fonts. The screen shown in FIG. 8 is representative of a look up table mapping of known fonts to stored fonts in memory. At column 300, incoming fonts (i.e., incoming fonts that are known) are identified at rows 302, 304, 306, 308, 310. For each of these fonts, a substitution font, available to the operator, is designated at column 312. Each font is also identified at column 314 as "on disk" if it is currently stored in machine memory, or "off" if the operator has the font available to him, but not currently loaded in machine memory, so that the user may treat his or her total collection of fonts as a library of fonts available to him, on or off the machine. A call for an unavailable font at the PDL is mapped to the new font, so that the new font may be used in generation of the bitmap image that the printer will ultimately print. An unavailable font may be mapped to more than one font, particularly where one of the fonts is not currently stored in machine memory. In that manner, the user can decide whether to take the time to load the best substitute font, or use the font currently stored in the machine memory. The described mapping function can be located either at a print controller or at a standalone device remote from the printer.

In accordance with another aspect of the invention, each equivalence or substitution mapping is given a level of degree of equivalency. This is an indicator representing the perception of the user as to how good a substitute the available font is for the unavailable font. Thus, at column 315, the equivalencies mapped are given a level or degree of equivalency on a scale of 1-3. Greater or lesser numbers of degrees of equivalency are possible, including the two element warning of "yes" (the fonts are equivalent for the purposes of the user) and "no" (the fonts while similar enough to be substituted occasionally, are not equivalent, and therefore a warning action is required).

Looking at the example of FIG. 8 to see how one operator's impression of equivalency might work, at row 302, incoming, unavailable font Helvetica ten point InverseLandscape font is mapped to available Triumvirate ten point InverseLandscape font. The operator has determined the two are highly equivalent, by designating them as having a level 1 degree of equivalence. By contrast, at row 310, unavailable Courier 22 Point Landscape font is mapped to Modern 24 Point Landscape font. These fonts are deemed by the operator to be poor equivalents, as the mapping is given a degree of equivalence of 3. While in the example shown, a font by font mapping is demonstrated, the equivalency could be mapped from typeface to typeface, as shown in row 306. An operator may also program the job to allow printing if the equivalency falls within a certain degree, changing that degree depending upon customer sensitivity to font use.

As an example of the levels of equivalence, the following table is but an example:

| DEGREE | DEFINITION | POSSIBLE ACTION |
| --- | --- | --- |
| 1 | Fully equivalent in all respects | Print job |
| 2 | Not fully equivalent, but acceptable substitution in many cases. | Print job with banner sheet warning |
| 3 | Unacceptable substitution for most cases. | Print job only after confirmation |

Of course, the definitions may be the user perceptions of equivalence, and may relate to matches, or match differences of weight, point size, how complete the character set, appearance of the characters, etc.

In accordance with a further aspect of the invention, substitutions may be prioritized. In the case where two substitutions may apply to a single font in different circumstances, it is necessary to prioritize the substitution. As shown in the table of FIG. 8, the situation may arise, for example, when a user has an excellent match for a single font within a typeface, such as for Helvetica 10 point InverseLandscape font mapped to Triumvirate 10 point InversePortrait, and a poorer match for the remainder of the typeface, Helvetica family mapped to Times Family. In such case, the better mapping should always be used. This may be done, as shown in FIG. 8, at column 316 by a numerical priority indicator, in this example case given as 1-5 which indicates priority through the mapping. Alternatively the ordering of the mappings may be pre-emptive, so that the first applicable mapping reached, is used.

When the document, in the PDL, specifies a particular font that is not available, an equivalency mapping searching function is enabled, which searches mapping for known fonts, and maps them to substitute fonts. A simplified flow chart of the operation is shown in FIG. 9A for a simple yes/no case. The PDL decomposer at image manipulation section 58 reads the document PDL and calls for the specified font (step 400). At step 410, a determination is made if the specified font is available. This step is indicated as optional, because the user may know that none of the stored fonts will ever match the incoming fonts, and therefore alter the selection method to search the substitution table in all cases. If the specified font is available, then the normal printing process is continued from step 420. If the specified font is not available, an optional determination is made at step 430, to determine if substitution is allowed. As noted, a user may be so font sensitive that no substitution of any kind are allowed. Non-allowance of substitution causes a default to step 450, a Job Fault sequence that follows certain procedures for ending the job from its run condition, notifying the operator or user that the job will not run, purging partially run sheets if any, etc. Additionally other font responses may optionally be invoked, including a request for help from the user in determining what font to use. If substitution is allowed at step 430, then the substitution function is available to determine an equivalent font by scanning the mapping of FIG. 8, at step 440. Next, at step 460, a determination is made as to whether the substitution font is available. If the substitute font is not available, then Job Fault step 450 procedures are followed, including the possible implementation of a nearest neighbor algorithm, which determined automatically the best match. If substitution is available, the substitution is made at step 470.

After substitution is made, if equivalence indicators are used, at step 480, the equivalence indicators are checked to determined if a warning is required for the substitution. If required, a warning signal is generated at step 490. After the equivalence determination step 480, the next step in printing the document is entered.

At FIG. 9B, the optional step of prioritization is demonstrated. This process may be part of the "match requested font38 step 440 of the flow chart of FIG. 9A. At step 442, the search proceeds until matches are found. At step 444, if multiple matches are found, priorities are examined at step 446 to determine which match should be used before continuing the substitution process.

In the case that an incoming font is not mapped to an available font, i.e., the font is not known by the system, a nearest neighbor algorithm may be implemented, and the results checked against available fonts and/or known fonts, so that a second pass against the table may be made.

It will no doubt be appreciated that numerous changes and modifications are likely to occur to those skilled in the art, and it is intended in the appended claims to cover all those changes and modifications which fall within the spirit and scope of the present invention.

We claim:

1. In an arrangement identifying characters in an electronically formatted document as printable in a selected font, and including means for converting the selected font to an available font, said converting means including:
    a font library storing a number of fonts therein, each stored font accessible when required for printing a character, when said selected font is among said stored fonts;
    means for determining whether the selected font is stored in said font library;
    means for comparing said selected font with a set of known fonts not stored in said font library, to determine whether said selected font is a member of said set;
    a programmable look up table, mapping known fonts not available in said font library, to fonts stored in said font library, as substitutions therefor, and allowing user designation of said mapping;
    means for determining, from said programmable look up table, a substitution font for a known font to a stored font; and
    means for using said substitution font for each selected font.

2. The device as defined in claim 1, wherein said programmable look up table in said font memory, mapping each known font to a stored font, provides indicia of equivalence for each mapping, indicating a degree of similarity of each stored font to each known font.

3. The device as defined in claim 1, wherein said programmable look up table in said font memory, mapping each known font to a stored font, provides indicia of equivalence for each mapping, indicating a degree of similarity of each stored font to each known font.

4. The device as defined in claim 3, including operator warning means for providing a hierarchy of warnings to an operator, in accordance with said indicia of equivalence.

5. The device as defined in claim 1, where for a known font mapped to plural stored fonts, means are provided for selecting a substitution font in accordance with a predetermined priority.

6. A method of controlling font substitution in an arrangement identifying characters in an electronically formatted document, each character designated as printable in a selected font, including the steps:
    storing in a font library a number of fonts, each stored font accessible when identified for a character, when said selected font is among said stored fonts;
    determining whether the selected font is stored in said font library;
    comparing said selected font with a set of known fonts not stored in said font library, to determine whether said selected font is a member of said set;
    determining, from a programmable look up table mapping known fonts not stored in said font library to stored fonts, a substitution font for a selected font determined not to be stored in said font library, said programmable look up table mapping each known font to a stored font generated by a user through a user interface to the table; and
    using said substitution font for each selected font.

7. The method as defined in claim 6, wherein said programmable look up table in said font memory, mapping each known font to a stored font, provides indicia of equivalence for each mapping, indicating a degree of similarity of each stored font to each known font.

8. The method as defined in claim 6, wherein said programmable look up table in said font memory, mapping each known font to a stored font, provides indicia of equivalence for each mapping, indicating a degree of similarity of each stored font to each known font.

9. The method as defined in claim 8, including the step of providing a hierarchy of operator warnings to an operator, in accordance with said indicia of equivalence, prior to using a substitution font.

10. The method as defined in claim 6, where for a known font mapped to plural stored fonts, means are provided for selecting a substitution font in accordance with a predetermined priority.

11. In a print controller for a printer, including an arrangement to print characters in a document transmitted to the controller, each character designated for printing in a selected font, including:
    font memory storing a number of fonts therein, each stored font accessible when required for printing a character, when said selected font is among said stored fonts;
    a programmable look up table in said font memory storing a set of user designated mappings, said table mapping known fonts to stored fonts, for substitution of said stored fonts therefor;
    means for determining whether the selected font is stored in said font memory;
    means for comparing said selected font with a set of known fonts not stored in said font library, to determine whether said selected font is a member of said set;

means for using said substitution font for each selected font, upon determination of unavailability thereof, for printing characters in the document designated for printing in the selected font.

12. The device as defined in claim 9, wherein said look up table, mapping known fonts to stored fonts for substitution, provides indicia of equivalence for each substitution, indicating a degree of similarity of each stored font to each known font.

13. The device as defined in claim 11, wherein said look up table, mapping known fonts to stored fonts for substitution, provides indicia of equivalence for each substitution, indicating a degree of similarity of each stored font to each known font.

14. The device as defined in claim 13, including operator warning means for providing a hierarchy of warnings to an operator, in accordance with said indicia of equivalence.

15. In a print controller for a printer, including an arrangement to print characters in a document transmitted to the controller, each character designated for printing in a selected font, including:
 font memory storing a number of fonts therein, each stored font accessible when required for printing a character, when said selected font is among said stored fonts;
 a user programmable look up table in said font memory, said table mapping known fonts to stored fonts, for substitution of said stored fonts therefor, said look up table additionally providing indicia of equivalence for each substitution, indicating a degree of similarity of each stored font to each known font;
 means for determining whether the selected font is stored in said font memory;
 means for comparing said selected font with a set of known fonts not stored in said font library, to determine whether said selected font is a member of said set;
 means for using said substitution font for each selected font, upon determination of unavailability thereof, for printing characters in the document designated for printing in the selected font.

16. The device as defined in claim 15, wherein said means for using said substitution font for each selected font, upon determination of unavailability thereof, operates in accordance with a predetermined response to the degree of equivalence of the substitution.

17. In a print controller for a printer, including an arrangement to print characters in a document transmitted to the controller, each character designated for printing in a selected font, including:
 font memory storing a number of fonts therein, each stored font accessible when required for printing a character, when said selected font is among said stored fonts;
 a user programmable look up table in said font memory, said table mapping known fonts to stored fonts, for substitution of said stored fonts therefor, said look up table additionally providing indicia of equivalence for each substitution, indicating a degree of similarity of each stored font to each known font;
 means for determining whether the selected font is stored in said font memory;
 means for comparing said selected font with a set of known fonts not stored in said font library, to determine whether said selected font is a member of said set;
 means for using said substitution font for each selected font, upon determination of unavailability thereof, said substitution font using means producing a predetermined response to the degree of equivalence of the substitution.

18. The device as defined in claim 17, wherein said predetermined response includes printing without warning of font substitution.

19. The device as defined in claim 17, wherein said predetermined response includes printing with warning of font substitution.

20. The device as defined in claim 17, wherein said predetermined response includes declaration of a machine fault.

21. The device as defined in claim 17, wherein said predetermined response includes a request at a user interface for confirmation of acceptability of the font substitution.

22. In an arrangement identifying characters in an electronically formatted document, as printable in a selected font, and including means for converting the selected font to an available font, said converting means including:
 a font library storing a number of fonts therein, each stored font accessible when required for printing a character;
 means for comparing said selected font with a set of known fonts not stored in said font library, to determine whether said selected font is a member of said set;
 a programmable look up table, mapping known fonts not available in said font library, to fonts stored in said font library, as substitutions therefor, said programmable look up table in said font memory, mapping each known font to a stored font, allowing user designation of said mapping; p1 means for determining, from said programmable look up table, a substitution font for a known font to a stored font; and
 means for using said substitution font for each selected font.

23. The device as defined in claim 22, wherein said programmable look up table in said font memory, mapping each known font to a stored font, provides indicia of equivalence for each mapping, indicating a degree of similarity of each stored font to each known font.

24. The device as defined in claim 22, wherein said programmable look up table in said font memory, mapping each known font to a stored font, provides indicia of equivalence for each mapping, indicating a degree of similarity of each stored font to each known font.

25. The device as defined in claim 22, including operator warning means for providing a hierarchy of warnings to an operator, in accordance with said indicia of equivalence.

26. A method of controlling font substitution in an arrangement identifying characters in an electronically formatted document, each character designated as printable in a selected font, including the steps:
 storing in a font library a number of fonts, each stored font accessible when required for printing a character, when said selected font is among said stored fonts;

comparing said selected font with a set of known fonts not stored in said font library, to determine whether said selected font is a member of said set;

determining, from a programmable look up table mapping known fonts not stored in said font library to stored fonts, a substitution font for a selected font, said programmable look up table mapping each known font to a stored font is generated by a user through a user interface to the table; and using said substitution font for each selected font.

27. The method as defined in claim 26, wherein said programmable look up table in said font memory, mapping each known font to a stored font, provides indicia of equivalence for each mapping, indicating a degree of similarity of each stored font to each known font.

28. The method as defined in claim 26, wherein said programmable look up table in said font memory, mapping each known font to a stored font, provides indicia of equivalence for each mapping, indicating a degree of similarity of each stored font to each known font.

29. The method as defined in claim 28, including the step of providing a hierarchy of operator warnings to an operator, in accordance with said indicia of equivalence, prior to using a substitution font.

30. A method of controlling font substitution in a print controller for a printer including an arrangement to print characters in a document transmitted to the controller, each character designated for printing in a selected font, including the steps:

storing in a font library a number of fonts, each stored font accessible when required for printing a character;

comparing said selected font with a set of known fonts not stored in said font library, to determine whether said selected font is a member of said set;

determining, from a programmable look up table mapping known fonts not stored in said font library to stored fonts, a substitution font for a selected font, said programmable look up table mapping each known font to a stored font is generated in response to user identification of mappings;

using said substitution font for each selected font, for printing characters in the document designated for printing in the selected font; and selecting a substitution font for a known font mapped to a plurality of substitution fonts in accordance with a predetermined priority.

31. In a print controller for a printer, including an arrangement to print characters in a document transmitted to the controller, each character designated for printing in a selected font, including:

a font library storing a number of fonts therein, each stored font accessible when required for printing a character. when said selected font is among said stored fonts;

means for determining whether the selected font is stored in said font library;

means for comparing said selected font with a set of known fonts not stored in said font library, to determine whether said selected font is a member of said set;

a programmable look up table, mapping known fonts not available in said font library, to fonts stored in said font library, as substitutions therefor, said programmable look up table allowing user designation of said mapping;

means for determining, from said programmable look up table, a substitution font for a known font to a stored font; and means for using said substitution font for each selected font for printing characters in the document designated for printing in the selected font.

32. The device as defined in claim 31, wherein said programmable look up table in said font memory, mapping each known font to a stored font, provides indicia of equivalence for each mapping, indicating a degree of similarity of each stored font to each known font.

33. The device as defined in claim 31, wherein said programmable look up table in said font memory, mapping each known font to a stored font, provides indicia of equivalence for each mapping, indicating a degree of similarity of each stored font to each known font.

34. The device as defined in claim 33, including operator warning means for providing a hierarchy of warnings to an operator, in accordance with said indicia of equivalence.

35. The device as defined in claim 30, where for a known font mapped to plural stored fonts, means are provided for selecting a substitution font in accordance with a predetermined priority.

36. A method of controlling font substitution in a print controller for a printer including an arrangement to print characters in an electronically formatted document transmitted to the controller, each character designated for printing in a selected font, including the steps:

storing in a font library a number of fonts, each stored font accessible when required for printing a character, when said selected font is among said stored fonts;

determining whether the selected font is stored in said font library;

comparing said selected font with a set of known fonts not stored in said font library, to determine whether said selected font is a member of said set;

generating via a user interface, in a programmable look up table, a mapping of each known font that may be called by an electronically formatted document, to stored fonts;

determining, from said programmable look up table mapping known fonts not stored in said font library to stored fonts, a substitution font for a selected font determined not to be stored in said font library; and using said substitution font for each selected font, for printing characters in the document designated for printing in the selected font.

37. The method as defined in claim 36, wherein said programmable look up table in said font memory, mapping each known font to a stored font, provides indicia of equivalence for each mapping, indicating a degree of similarity of each stored font to each known font.

38. The method as defined in claim 36, wherein said programmable look up table in said font memory, mapping each known font to a stored font, provides indicia of equivalence for each mapping, indicating a degree of similarity of each stored font to each known font.

39. The method as defined in claim 38, including the step of providing a hierarchy of operator warnings to an operator, in accordance with said indicia of equivalence, prior to using a substitution font.

40. The method as defined in claim 36, where for a known font mapped to plural stored fonts, means are provided for selecting a substitution font in accordance with a predetermined priority.

* * * * *